US009727472B2

(12) United States Patent
Madhusudana et al.

(10) Patent No.: US 9,727,472 B2
(45) Date of Patent: Aug. 8, 2017

(54) CACHE COHERENCY AND SYNCHRONIZATION SUPPORT IN EXPANDERS IN A RAID TOPOLOGY WITH MULTIPLE INITIATORS

(71) Applicant: AVAGO TECHNOLOGIES GENERAL IP (SINGAPORE) PTE. LTD., Singapore (SG)

(72) Inventors: Naresh Madhusudana, Bangalore (IN); Naveen Krishnamurthy, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 586 days.

(21) Appl. No.: 13/767,043

(22) Filed: Feb. 14, 2013

(65) Prior Publication Data
US 2014/0229670 A1     Aug. 14, 2014

(51) Int. Cl.
*G06F 12/14*    (2006.01)
*G06F 12/0866*    (2016.01)
*G06F 3/06*    (2006.01)
*G06F 12/0815*    (2016.01)

(52) U.S. Cl.
CPC ........ *G06F 12/0866* (2013.01); *G06F 3/0619* (2013.01); *G06F 3/0629* (2013.01); *G06F 3/0635* (2013.01); *G06F 3/0689* (2013.01); *G06F 12/0815* (2013.01); *G06F 12/1416* (2013.01); *G06F 2212/262* (2013.01)

(58) Field of Classification Search
CPC ............... G06F 12/0815–12/0842; G06F 12/14–12/1491; G06F 17/30359–17/30362; G06F 3/0689
USPC .......................... 711/141–146, 152
See application file for complete search history.

(56) References Cited

U.S. PATENT DOCUMENTS

| 5,226,143 | A | * | 7/1993 | Baird et al. | .............. 711/145 |
| 6,073,218 | A | * | 6/2000 | DeKoning et al. | ........... 711/150 |
| 7,890,617 | B2 | | 2/2011 | Odenwald et al. | |
| 2006/0277361 | A1 | * | 12/2006 | Sharma | ............... G06F 3/0617 711/114 |
| 2007/0088928 | A1 | * | 4/2007 | Thangaraj et al. | ........... 711/163 |
| 2008/0005470 | A1 | * | 1/2008 | Davies | ................. G06F 3/0617 711/114 |
| 2008/0168458 | A1 | * | 7/2008 | Fachan et al. | ............... 718/104 |
| 2011/0145452 | A1 | * | 6/2011 | Schilling et al. | .............. 710/74 |

(Continued)

*Primary Examiner* — Nicholas Simonetti
(74) *Attorney, Agent, or Firm* — Sheridan Ross P.C.

(57) ABSTRACT

Systems and methods presented herein provide for region lock management in an expander. In one embodiment, an expander, being operable to link a plurality of initiators to a plurality of Redundant Array of Independent Disks logical volumes, includes a plurality of physical transceivers, each being operable to link the logical volumes to the initiators, and a region lock manager operable to receive a request from a first of the initiators to lock a region of the logical volumes for an input/output operation by the first initiator. The region lock manager is also operable to determine if the requested region is unlocked, to lock the requested region from the remaining initiators to allow the input/output operation of the first initiator after determining the requested region is unlocked, and to unlock the requested region after the input/output operation of the first initiator is complete.

20 Claims, 9 Drawing Sheets

(56) References Cited

U.S. PATENT DOCUMENTS

2012/0303850 A1* 11/2012 Sarkar .................. G06F 13/26
710/265
2013/0111126 A1* 5/2013 Myrah ................ G06F 3/0608
711/114

* cited by examiner

CACHE COHERENCY AND SYNCHRONIZATION SUPPORT IN EXPANDERS IN A RAID TOPOLOGY WITH MULTIPLE INITIATORS

FIELD OF THE INVENTION

The invention generally relates to the field of cache coherency and synchronization management to control access among initiators in a storage system and maintain data integrity of the storage system.

BACKGROUND

A "region lock" is I/O synchronization which prevents data integrity issues in a Redundant Array of Independent Disk (RAID) data storage system by preventing multiple initiators (or other execution entities, such as threads) from simultaneously accessing a particular RAID logical volume in the storage system. In a "multi-initiator" RAID storage system, each initiator maintains a local Input/Output (I/O) cache and a region lock management structure. Each region lock generally includes a data structure within the initiator to maintain a list of locked and unlocked regions in all individual RAID logical volumes and grants its initiator a "lock" to a region of a RAID logical volume when the region becomes available such that the initiator may perform I/O operations thereto. In existing methods, initiators are separated from each other by an inter-server connection. Because initiators maintain their own region locking data, the region locks become desynchronized and potentially corrupt data in the storage system which is common to multiple initiators. Cache coherency is also at risk in such a multi-initiator system.

SUMMARY

Systems and methods presented herein provide for an expander that provides region lock management to initiators coupled thereto. As the region lock management functionality is pushed down into the expander level, initiators no longer need to communicate with one another to ensure cache coherency and region lock management, resulting in less complex and more efficient storage systems.

In one embodiment, an expander, operable to link a plurality of initiators to a plurality of RAID logical volumes, includes a plurality of physical transceivers, each being operable to link the logical volumes to the initiators. The expander also includes a region lock manager operable to receive a request from a first of the initiators to lock a region of the logical volumes for an input/output operation by the first initiator. The region lock manager is also operable to determine if the requested region is unlocked, to lock the requested region from the remaining initiators to allow the input/output operation of the first initiator after determining the requested region is unlocked, and to unlock the requested region after the input/output operation of the first initiator is complete.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
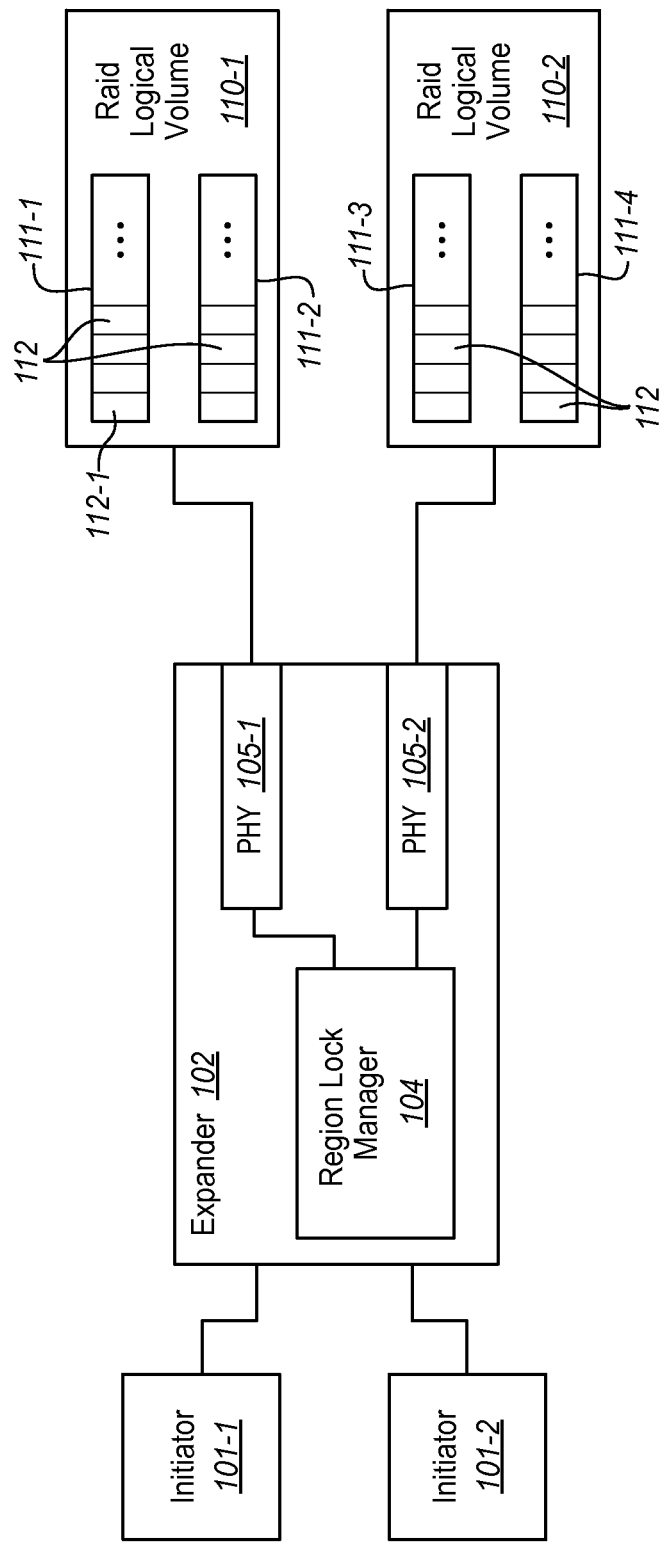
FIG. 1 is a block diagram of an exemplary expander implementing region lock management.

FIG. 1 is a block diagram of an exemplary expander 102 implementing region lock management for a plurality of RAID logical volumes 110-1-110-2. The expander 102 is operable to link a plurality of initiators 101-1-101-2 to the RAID logical volumes 110-1-110-2 and their associated storage devices 111-1-111-4 configured therein. For example, the initiators 101 include storage controllers, or Host Bus Adapters (HBA), that processes host I/O to communicate with one or more of the storage devices 111 via a data network, or "switched fabric". In this regard, the expander 102 directs I/O operations of the initiators 101 to various storage regions 112 within the storage devices 111 of the RAID logical volumes 110.

The expander 102 is thus any device, system, software, or combination thereof operable to connect between RAID logical volumes and initiators, including to other expanders, to form the switched fabric such that I/O operations to the various regions 112 of the storage devices 111 (also known as "extents" or "blocks") may be performed. One example of the expander 102 is a wide port Serial Attached Small Computer System Interface (SAS) expander that uses the SAS protocol to communicate between the initiators and the storage devices 111 and create the switched fabric. However, the expander 102 may be operable to forward or otherwise route communications for the RAID storage system according to one or more protocols including Serial Attached Small Computer System Interface (SAS), FibreChannel, Ethernet, ISCSI, etc. The storage devices 111 implement the storage capacity for the RAID storage system as one or more RAID logical volumes 110, and may comprise any media and/or interfaces capable of storing and/or retrieving data in a computer readable format. The storage devices 111 may be magnetic hard disks, solid state drives, optical media, or the like The expander 102 includes a region lock manager 104 that is operable to control I/O operations from the initiators 101 to the storage regions 112 to ensure that the initiators 101 do not access the same region 112 at the same time as such duplicated access may corrupt data within the RAID logical volumes 110.

The expander 102 also includes PHYs 105 which are any combination of hardware, software, firmware, and other associated logic capable of providing physical transceivers between elements disclosed herein. The RAID logical volumes 110 include any combination of devices, systems, and software operable to concatenate, stripe together, or otherwise combine storage partitions of disk drives into larger "virtual partitions" that can generally be resized or moved without interrupting system use.

Although shown or described with respect to a particular number of initiators 101, expanders 102, PHYs 105, RAID logical volumes 110, and storage devices 111, the invention is not intended to be limited to such. The embodiment shown in FIG. 1 merely illustrates one example of how region lock management may be implemented within an expander. Other exemplary embodiments of expanders and region lock managers are shown and described below. Discussion of the expander 102 and its associated region lock manager 104 will now be directed to the flowchart of FIG. 2.

Figure 2:
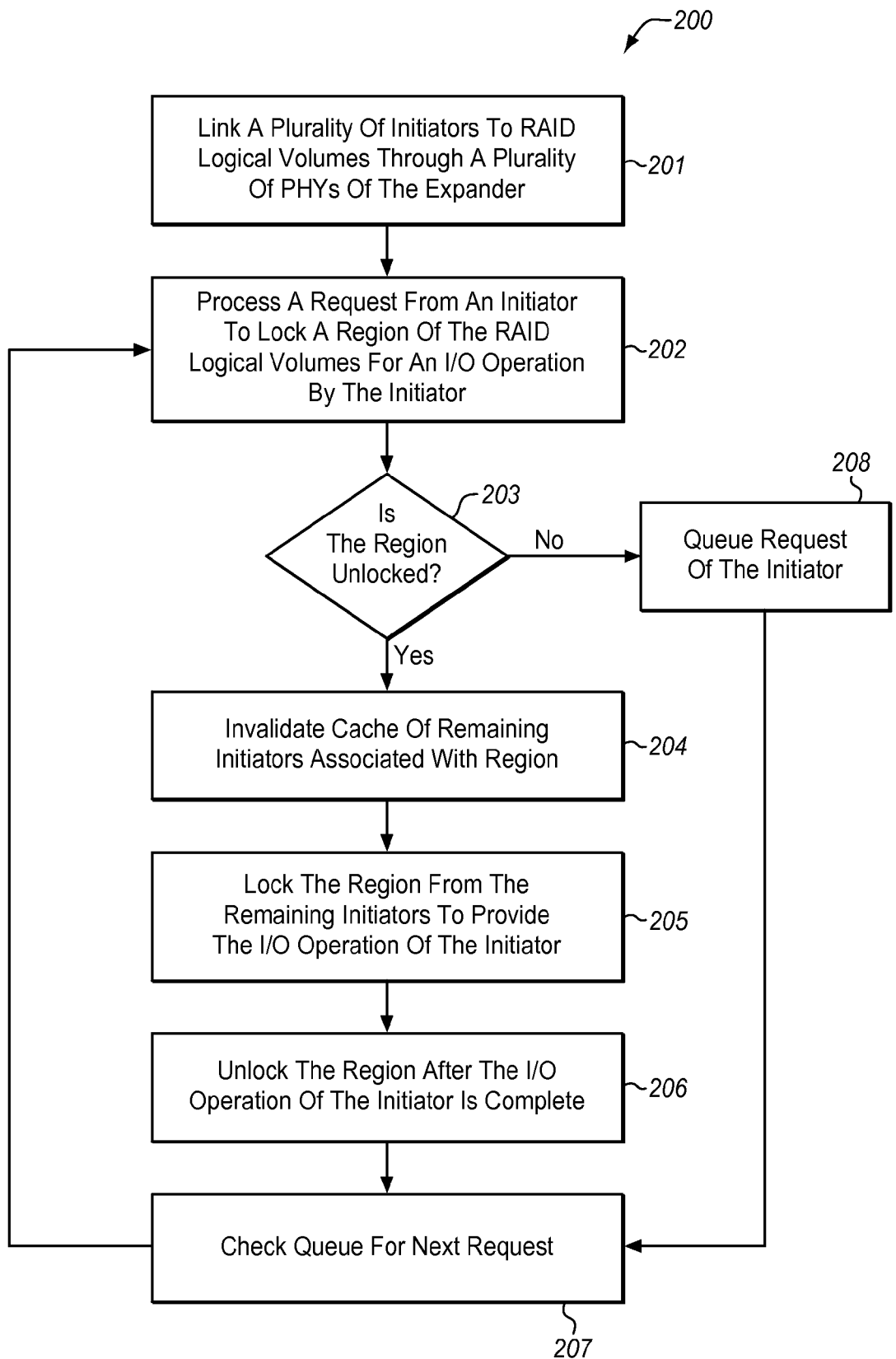
FIG. 2 is a flowchart of an exemplary method for performing region lock management with the expander of FIG. 1.

FIG. 2 is a flowchart of an exemplary method 200 for performing region lock management with the expander 102 of FIG. 1. The method is operable once the expander 102 links a plurality of initiators 101 to the RAID logical volumes 110 through a plurality of PHYs 105 of the expander 102, in the process element 201, such that I/O operations between the initiators 101 and the RAID logical volumes 110 can begin. From there, the expander 102 receives a request from a first initiator 101-1 to access and lock a storage region 112-1 within a first RAID logical volume 110-1. The region lock manager 104 processes the request in the process element 202 and then determines whether the storage region 112-1 is unlocked, in the process element 203.

The region lock manager 104 is operable to ensure that an initiator 101 has exclusive access to the storage region 112-1 during an I/O operation. Thus, if the storage region 112-1 is locked, no initiators 101 other than the initiator 101 presently accessing the storage region 112 can access the storage region 112-1. And, if the storage region 112-1 is locked, another initiator (e.g., the initiator 101-2) is performing an I/O operation to the storage region 112-1. The region lock manager 104 thereby queues the I/O of the requesting initiator (e.g., the initiator 101-1) until the storage region 112-1 is again unlocked, in the process element 208.

If the storage region 112-1 is unlocked, then the region lock manager 104 locks the storage region 112-1 from the initiator 101-2 (and any other initiators) to provide the I/O operation of the initiator 101-1, in the process element 204 (e.g., by updating region locking information stored in the expander to indicate the lock). Prior to doing so, the region lock manager 104 may invalidate the cache of any remaining initiators associated with the requested region, in the process element 204. For example, the region lock manager 104 may force the other initiators to update their respective caches after the currently requesting initiator completes its I/O operations to the region to maintain cache coherency among the initiators.

Once the initiator 101-1 completes its I/O operation to the storage region 112-1, the region lock manager 104 unlocks the storage region 112-1, in the process element 206. As an ongoing process, the region lock manager 104 also checks the queue to determine whether another I/O request was made to the storage region 112, in the process element 207. If so, the region lock manager 104 proceeds to process a queued request to lock the storage region 112-1, in the process element 202. Otherwise, the region lock manager 104 simply waits for the next I/O request to the storage region 112-1.

Generally, the method 200 is used in performing many I/O operations at the same or substantially the same time. The embodiment shown herein is merely intended to concisely describe one particular I/O operation so that one skilled in the art will more readily understand the concepts of region lock management disclosed herein as other regions may be locked and unlocked at or about the same time. Accordingly, the invention is not intended to be limited to the expander 102 simply checking a queue for next I/O operation request. Again, the invention is not intended to be limited to any particular number of initiators 101, RAID logical volumes 110, storage regions 112, etc. Nor is the invention intended to be simply limited to the access to one particular storage region 112-1 as illustrated.

In one embodiment, the expander 102 is operable to communicate with the initiators 101 and the RAID logical volumes 110 via the Serial Management Protocol (SMP) of the SAS specification. The SMP also allows the expander 102 to communicate with other expanders. A vendor specific SMP generated by an initiator 101 is used to communicate with the expander 102 to obtain a region lock and generally contains information like the region details of a particular RAID volume. Once the I/O operation of the initiator 101 is complete, the initiator 101 transfers another SMP to the expander 102 to unlock the region. An example of such is shown and described below in the exemplary expander 102 of FIG. 3.

Figure 3:
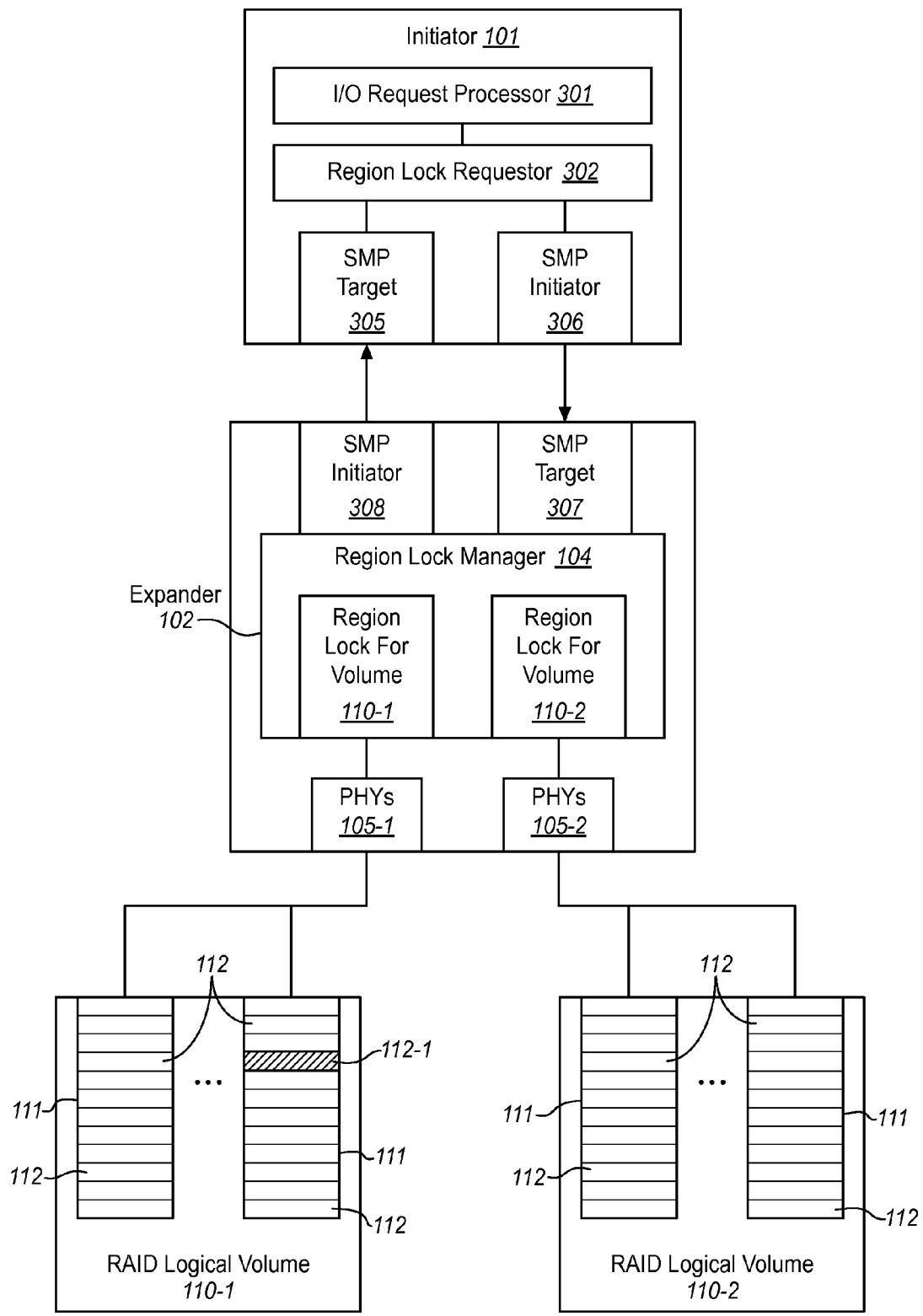
FIG. 3 is a block diagram of another exemplary embodiment of the expander implementing region lock management.

In FIG. 3, the initiator 101 generates an I/O request via an I/O request processor 301 to perform an I/O operation to a particular storage region 112 of a RAID logical volume 110. In this example, the I/O request performs the I/O operation on the storage region 112-1 of the RAID logical volume 110-1. The initiator 101 transfers the I/O request to a region lock requestor 302 of the initiator 101 such that a region lock request can be generated to lock the storage region 112-1 for use by the initiator 101. Once generated, the region lock requester 302 transfers the region lock request to the expander 102 using an SMP initiator 306. The expander 102 includes a corresponding SMP target 307 that transfers the region lock request to the region lock manager 104 for processing.

The region lock manager 104 maintains region lock data for each of the volumes 110 (i.e., region locks for volumes 110-1 and 110-2). The region lock manager 104 accesses this data to determine if a particular region is presently locked. In this example, the region lock manager 104 determines that the storage region 112-1 of the RAID logical volume 110-1 is presently unlocked. Accordingly, the region lock manager 104 locks the storage region 112-1 for the initiator 101 and responds to the region lock request of the initiator 101 via the SMP initiator 308 of the expander 102 and the SMP target 305 of the initiator 101. Before doing so, however, the region lock manager 104 may invalidate the caches of other initiators using the vendor specific SMP messaging techniques just described. Afterwards, the initiator 101 transfers the I/O request to the RAID logical volume 110-1 to commence the I/O operation on the region 112-1.

Once the I/O operation on the region 112-1 is complete, the initiator 101 transfers a region lock release message from the region lock requester 302 to the region lock manager 104 via the SMP initiator 306 and the SMP target 307. The region lock manager 104 thereby releases or unlocks the storage region 112-1 and updates the region lock data for the logical volume 110-1 for subsequent I/O operations.

Figure 4:
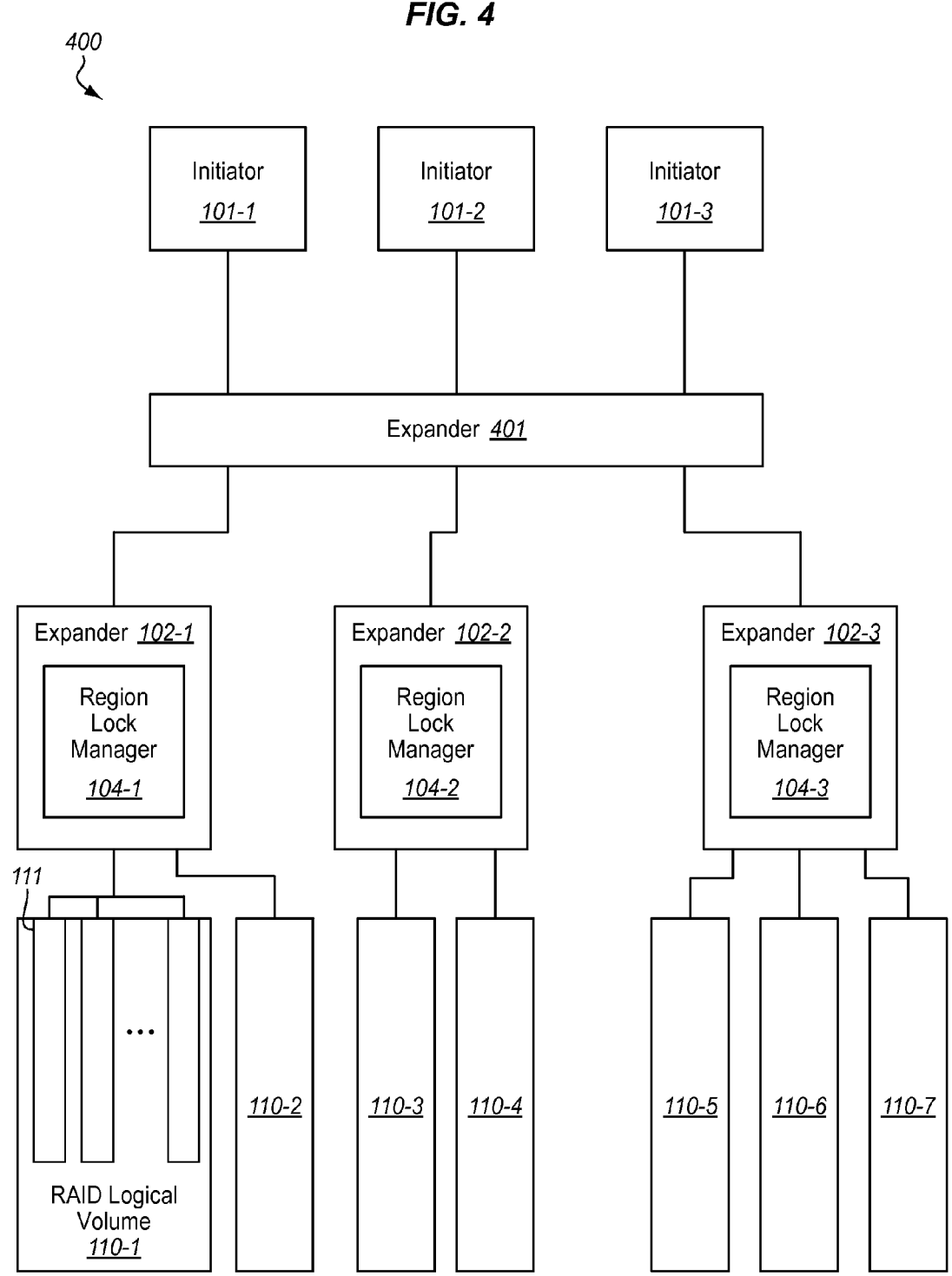
FIG. 4 is a block diagram of an exemplary system of multiple expanders implementing region lock management for multiple initiators.

Again, the embodiment illustrated in FIG. 3 illustrates one rudimentary example of region lock management to illustrate the basic principles of the embodiments disclosed herein. Those skilled in the art would generally understand that a single initiator 101 performing I/O operations on the RAID logical volumes 110-1 and 110-2 may not likely require region lock management because only one host would be performing I/O operations on the storage region. Region lock management is more important when there are multiple initiators operable to access the same region within a RAID logical volume 110 at the same time. FIG. 4 illustrates an example of multiple initiators as well as multiple expanders operating on a plurality of RAID logical volumes FIG. 4 is a block diagram of an exemplary system 400 of multiple expanders implementing region lock management for multiple initiators 101-1-101-3. In this embodiment, an expander 401 is operable to interconnect with other expanders 102-1-102-3 and the region lock management is pushed closest to the RAID logical volumes 110. More specifically, the expander 102-1 provides region lock management to the RAID logical volumes 110-1 and 110-2 via the region lock manager 104-1, the expander 102-2 provides region lock management to the RAID logical volumes 110-3 and 110-4 via the region lock manager 104-2, and the expander 102-3 provides region lock management to the RAID logical volumes 110-5, 110-6, and 110-7 via the region lock manager 104-3. Thus, the expander 401 is alleviated from region lock management of the RAID logical volumes 110.

Figure 6:
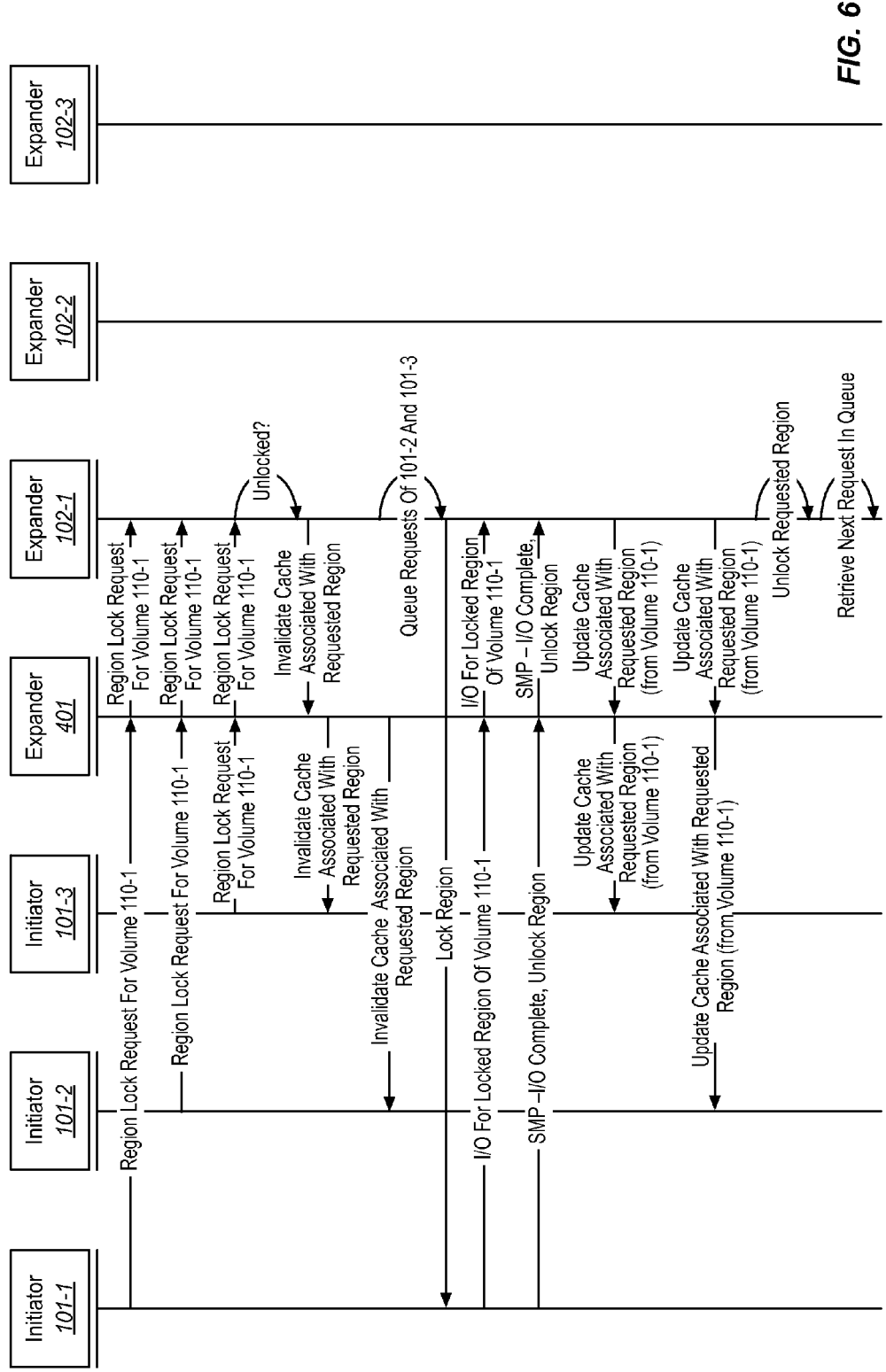
Figure 7:
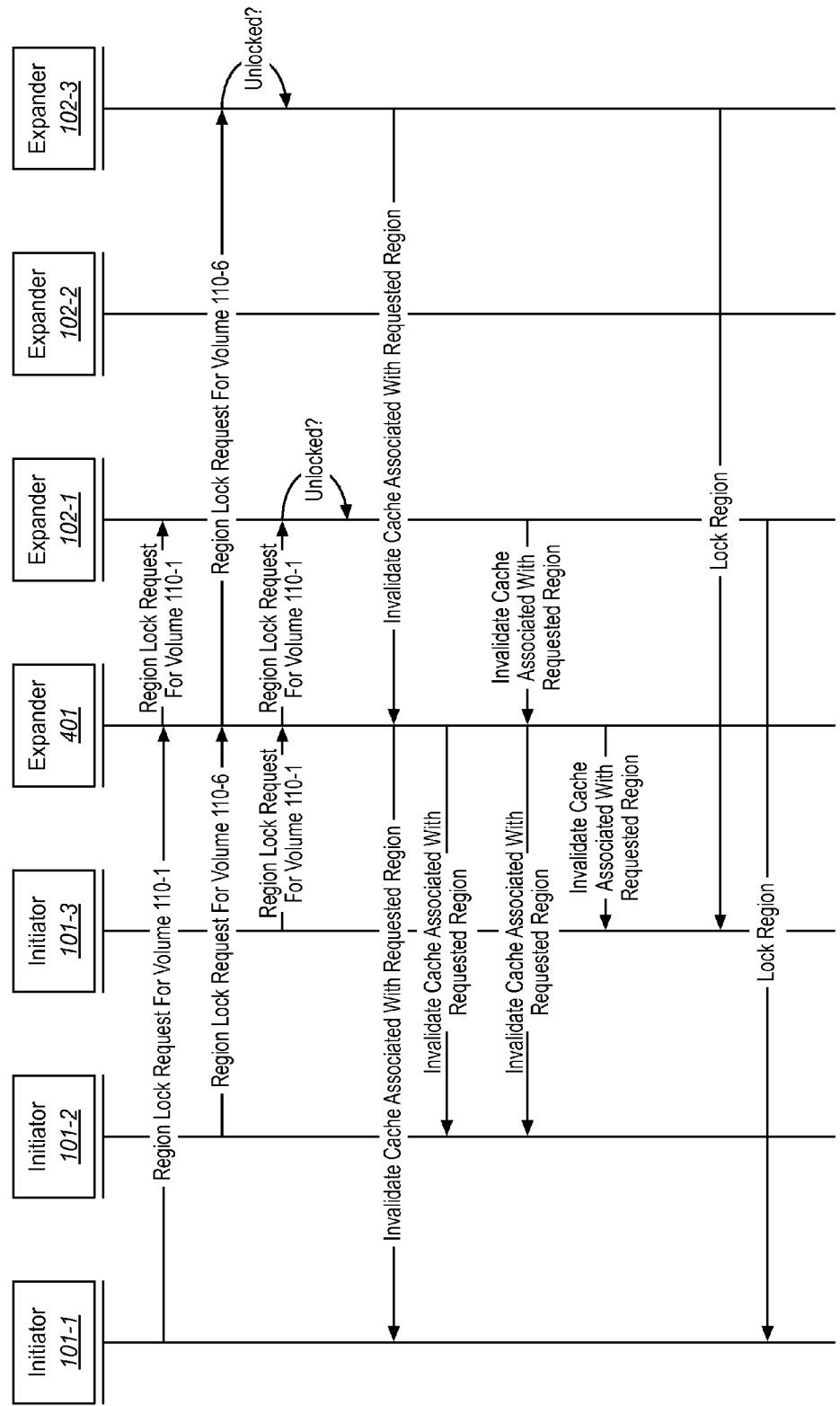

The initiators 101-1-101-3 may each generate their region lock requests via their respective region lock requesters 302 (as shown above) and transfer those requests to the appropriate expander 102 via the SMP communications described above. Examples of such messaging and region lock requests in a multi-initiator environment are illustrated in FIGS. 5-7.

Figure 5:
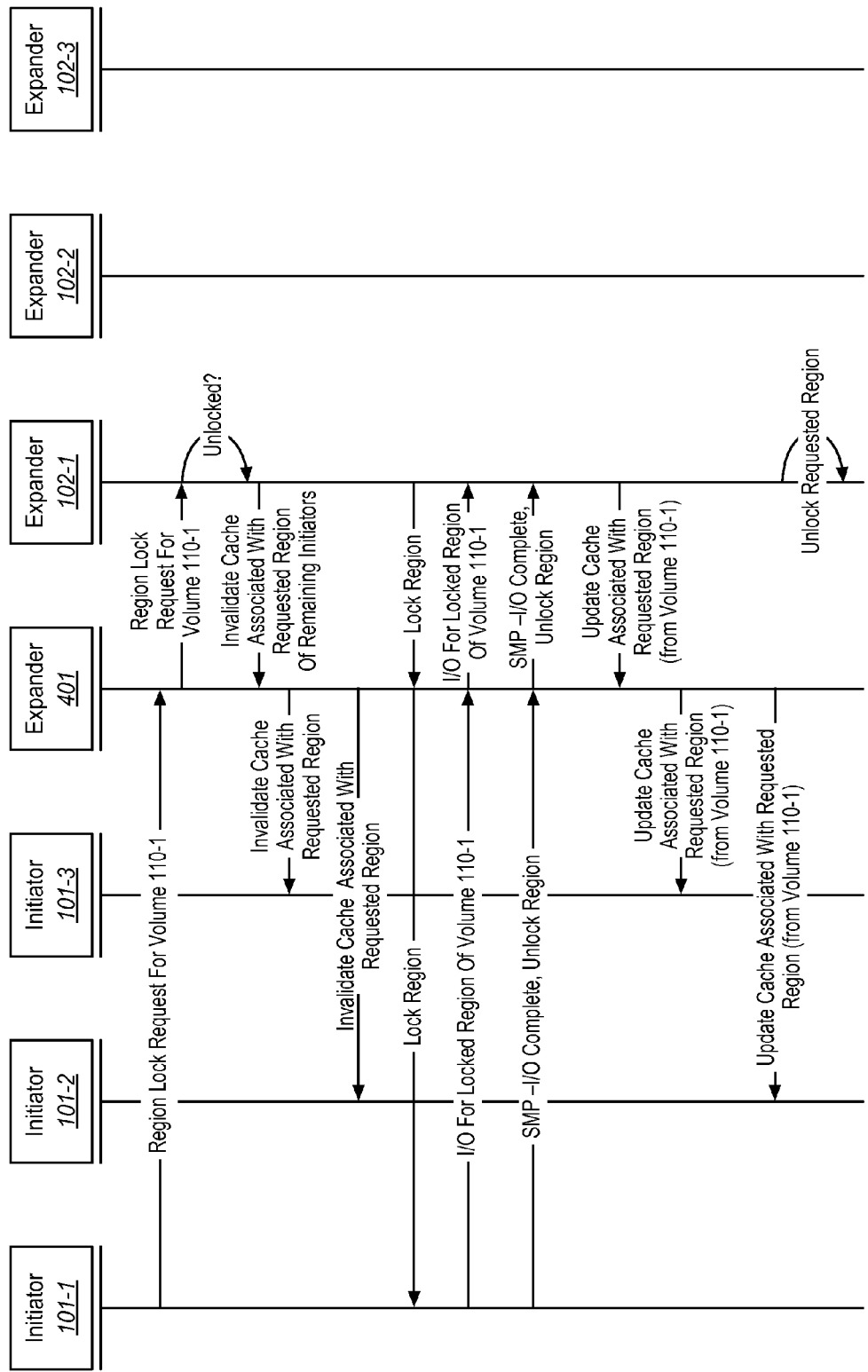
FIGS. 5-7 are exemplary message diagrams of a multi-initiator region lock management environment including cache coherency management.

FIG. 5 illustrates an embodiment where the cache coherency of the individual initiators 101-1-101-3 may be maintained even though the region lock management is pushed down to the individual expanders 102-1-102-3. In other words, cache coherency is maintained between the initiators 101-1-101-3 without the initiators having to communicate directly to one another. To illustrate, the initiator 101-1 transfers a region lock request for the RAID logical volume 110-1 to the expander 401 which, in turn, forwards the request to the expander 102-1 managing region locks for the volumes 110-1 and 110-2.

The expander 102 upon receiving the request determines whether the requested storage region is unlocked. If so, the expander 102-1 communicates via SMP to the initiators 101-2 and 101-3 to invalidate the I/O caches of those initiators to ensure blocking of the I/O operations to the storage region. For example, if an I/O operation is performed on a particular region by the initiator 101-1 and the remaining initiators 101-2 and 101-3 are unaware of that I/O operation, the I/O caching data would be inaccurate. And, the I/O operations to that storage region could not be re-created from the corrupt I/O data of the initiators 101-2 and 101-3 if needed.

After the caches of the initiators 101-2 and 101-3 are invalidated, the region lock manager 104-1 of the expander 102-1 (via the expander 401) locks the requested region of the storage volume 110-1 for the initiator 101-1 such that the initiator 101-1 may commence I/O operations to the storage region. After the I/O operations are complete, the initiator 101-1 informs the expander 102-1 of such and the region lock manager 104-1 updates the caches associated with the requested storage region of the RAID logical volume 110-1 for each initiator 101-2 and 101-3. Alternatively, the initiators 101-2 and 101-3 update their respective caches on their own, as each has been invalidated by the initiator 101-1, by individually accessing the affected volume, thus ensuring that the caches are properly updated. The expander 102-1 then unlocks the storage region of the storage volume 110-1, thereby ensuring that the storage region has not been altered until the caches have been updated.

FIG. 6 illustrates queuing performed by the expander 102-1 when multiple region lock requests are received from the initiators 101-1-101-3. In this embodiment, each of the initiators 101-1-101-3 requests the same storage region of the logical volume 110-1 around the same time. The expander 102-1 then determines whether the storage region of the logical volume 110-1 is unlocked. If so, the expander 102-1 may invalidate the caches of the initiators whose requests are to be queued (initiators 101-2 and 101-3 in this example). The expander then queues the request of the initiators 101-2 and 101-3 and locks the storage region of the logical volume 110-1 for I/O operations by the initiator 101-1. After the I/O operation by the initiator 101-1 is complete, the initiator 101-1 indicates such to the expander 102-1 such that the expander 102-1 can update the caches of the remaining initiators 101-2 and 101-3, unlock the storage region of the volume 110-1, and retrieve the next request for the storage region from the queue and thereby lock the region as just described.

FIG. 7 illustrates an extension of that which is discussed above in showing that multiple requests for different storage regions may be processed at or about the same time. For example, the initiator 101-1 may request the storage region from the logical volume 110-1 while the initiator 101-2 requests a storage region from the logical volume 110-6. The expanders 102-1 and 102-3 operate in tandem to coordinate the invalidation of I/O cache associated with requested storage regions within the initiators 101-1 and 101 so as to maintain the coherency of the I/O data within those initiators. In other words, since different storage regions are being accessed, region lock managers 104-1-104-3 are also tasked with the management of invalidating individual caches of the initiators 101-1-101-3. Thus, the locking of different storage regions should be coordinated with caches of I/O data being invalidated. Such coordination may be implemented in a variety ways including round-robin scheduling techniques.

Cache coherency of the initiators is maintained at the expander level with a region lock manager 104 sending vendor specific SMPs to the other initiators. The SMP has details regarding the logical volume, the region in the logical volume being locked, etc. Upon receiving the SMP from the region lock manager 104, the remaining initiators will invalidate their caches for the region being locked. Once this is done and if there is an I/O operation to the locked region, the initiator reads from the logical volume itself. Thus, cache coherency is maintained between with the initiators 101-1-101-3 without direct communication between the initiators.

Figure 8:
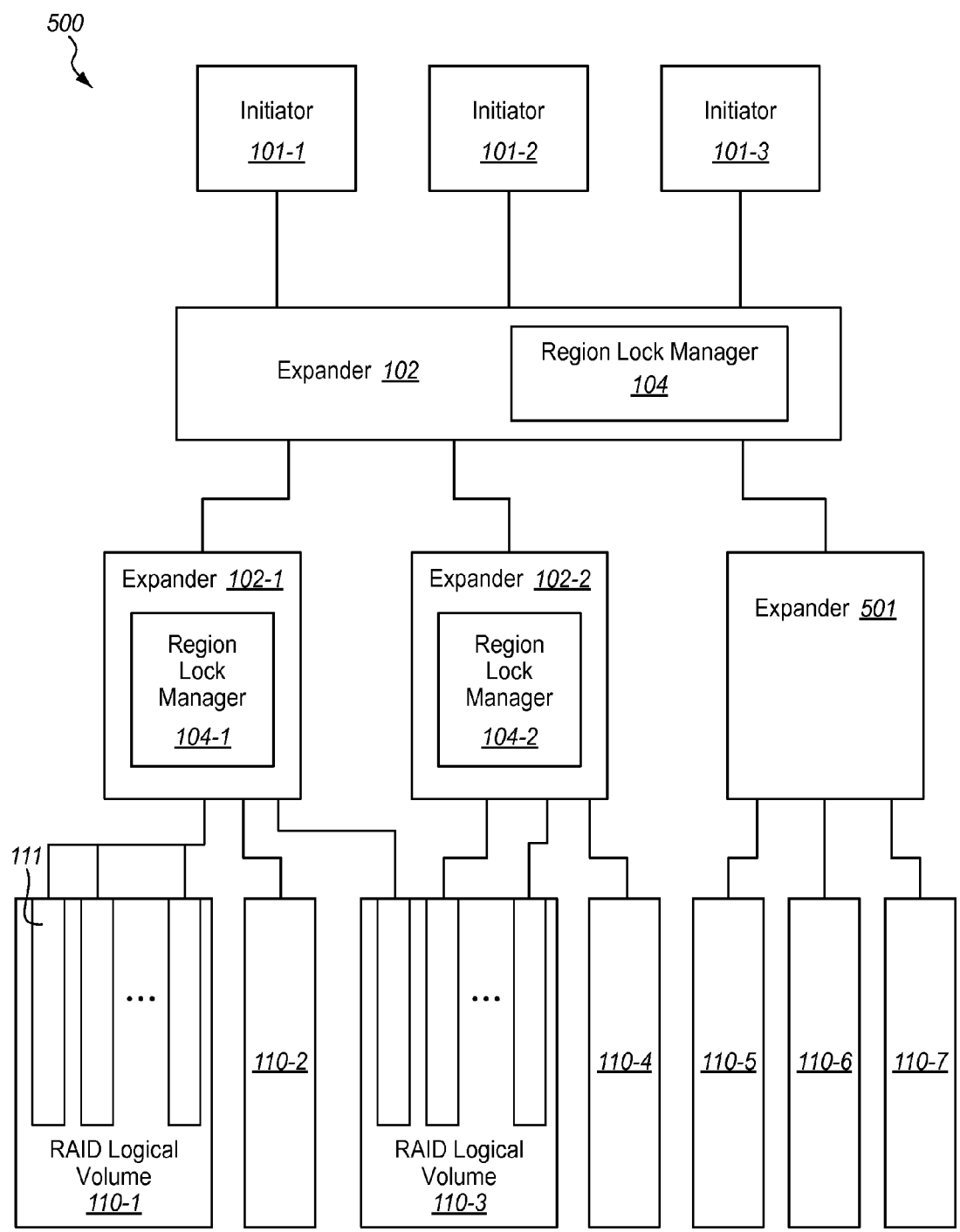
FIG. 8 is a block diagram of another exemplary system of multiple expanders implementing region lock management and cache coherency management for multiple initiators.

FIG. 8 is a block diagram of another exemplary system of multiple expanders implementing region lock management for multiple initiators. In this embodiment, the expander 501 does not include region lock management for its respective logical volumes 110-5-110-7 for whatever reason. While the region lock management functionality has been pushed down to the expanders 102-1 and 102-2 for their respective logical volumes 110-1-110-4, the expander 102-3 relies on the upstream expander 102 and its corresponding region lock manager 104 to perform region lock management for the logical volumes 110-5-110-7.

It is also possible for a partial region lock management solution to be implemented using a mix of existing RAID storage controller-based region lock managers with expander-based region lock managers. For example, assume that the upstream expander 102 does not employ a region lock manager as illustrated and that the downstream expander 501 also does not employ a region lock manager. The region lock managers 104-1 and 104-2 still maintain control over region locks for the logical volumes 110-1-110-4. Region lock management for the logical volumes 110-5-110-7 however may be maintained by the existing region lock management functionality of the storage controllers of the initiators 101-1-101-3. In doing so, the RAID storage controller-based region lock manager may coordinate with the region lock managers 104-1 and 104-2 of the downstream expanders 102-1 and 102-2. Again, this is a non optimal solution as the inter-server communication between the initiators 101-1 and 101-3 can have latency issues that cause the I/O cache coherency to desynchronize. Similarly, the region lock managers 104-1 and 104-2 may coordinate to maintain cache coherency of the storage volumes 110-1-110-4 as a share a common storage volume 110-1.

Figure 9:
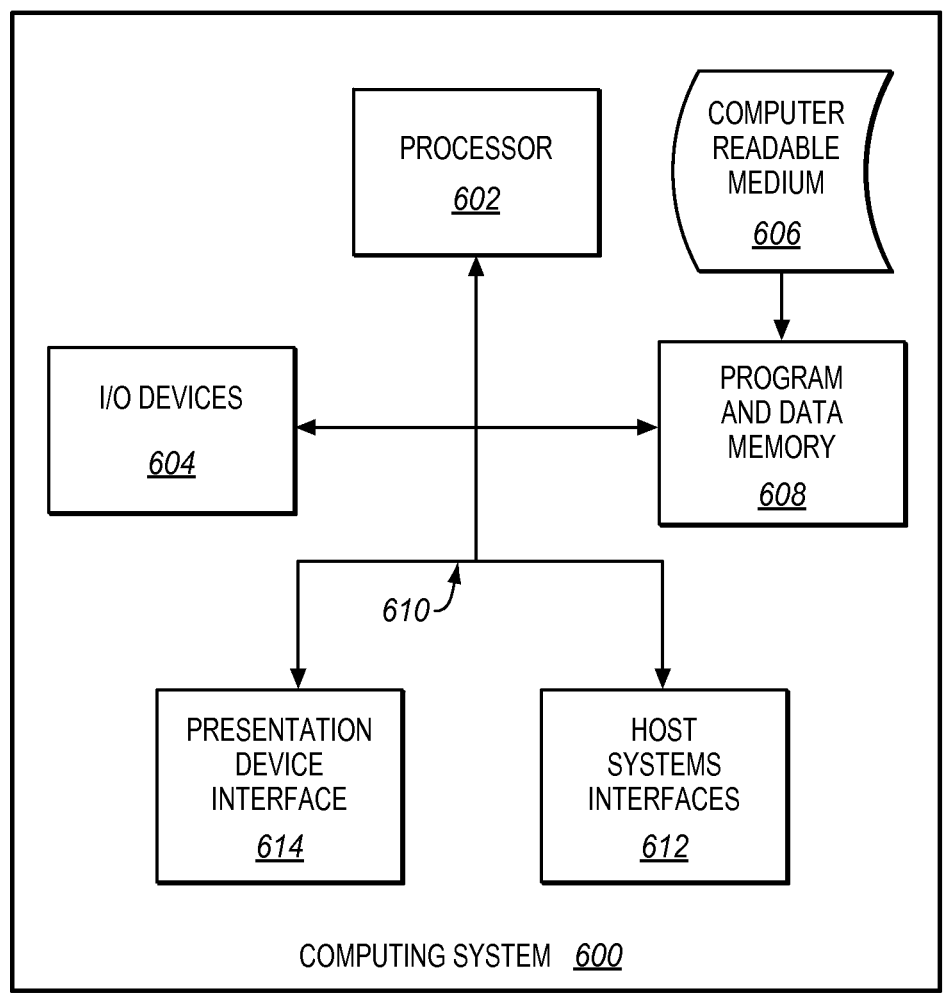
FIG. 9 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 illustrates a computing system 600 in which a computer readable medium 606 may provide instructions for performing any of the methods disclosed herein.

Furthermore, the invention can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computing system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 612, or remote printers or storage devices through intervening private or public networks. Modems, cable modem and Ethernet cards are just a few of the currently available types of network adapters.

What is claimed is:

1. An expander operable to link a plurality of initiators to a plurality of Redundant Array of independent Disks logical volumes, the expander comprising:
a plurality of physical transceivers, each being operable to link the logical volumes to the initiators;
a region lock manager operable to receive a request from a first of the initiators to lock a storage region of the logical volumes for an input/output operation by the first initiator, to determine if the requested storage region is unlocked, to lock the requested storage region from the remaining initiators to allow the input/output operation of the first initiator responsive to determining the requested storage region is unlocked, and to unlock the requested storage region after the input/output operation of the first initiator is complete;
one or more message initiators that are coupled to the plurality of initiators and enable the expander to transmit requests to the plurality of initiators; and
one or more message targets that transfer the request to the region lock manager for processing.

2. The expander of claim 1, wherein:
the expander is further operable to link to another expander to provide region lock management for at least one of the plurality of logical volumes coupled to the other expander.

3. The expander of claim 1, wherein:
the region lock manager is further operable to receive a request from a second of the initiators to lock the requested storage region when the requested storage region is locked, and to queue the request of the second initiator until the requested storage region is unlocked.

4. The expander of claim 1, wherein:
the region lock manager is further operable to invalidate an input/output cache in a second of the initiators when locking the requested storage region,
wherein the input/output cache of the second initiator is associated with the requested storage region.

5. The expander of claim 1, wherein:
the region lock manager is further operable to coordinate region lock management with an initiator performing region lock management on another plurality of Redundant Array of Independent Disks logical volumes.

6. The expander of claim 1, wherein:
the request is a Serial Management Protocol request,
the one or more message initiators comprises a Serial Management Protocol initiator, and
the one or more message targets comprises a Serial Management Protocol target.

7. The expander of claim 6, wherein:
the region lock manager is further operable to unlock the requested storage region in response to another Serial Management Protocol request from the initiator to unlock the requested storage region.

8. A method, operable within an expander, of managing storage regions of a plurality of Redundant Array of Independent Disks logical volumes, the method comprising:
linking a plurality of initiators to the logical volumes through a plurality of physical transceivers of the expander;
coupling the expander to the plurality of initiators with both a message target of the expander and a message initiator of the expander;
receiving a request from a first of the initiators to lock a storage region of the logical volumes for an input/output operation by the first initiator, the request being received at the message target of the expander;
forwarding the received request from the message target of the expander to a region lock manager;
processing, with the region lock manager, the received request;
determining if the requested storage region of the logical volumes is unlocked;
locking the requested storage region from the remaining initiators to allow the input/output operation of the first initiator responsive to determining the requested storage region is unlocked; and
unlocking the requested storage region after the input/output operation of the first initiator is complete.

9. The method of claim 8, further comprising:
queuing requests from the remaining initiators for the requested storage region until the requested storage region is unlocked.

10. The method of claim 8, further comprising:
linking to another expander to provide region lock management for at least one of the plurality of logical volumes coupled to the other expander.

11. The method of claim 8, further comprising:
accessing a queue to retrieve a request from a second initiator in response to unlocking the requested storage region after the input/output operation of the first initiator is complete; and
locking the requested storage region from the remaining initiators to allow the input/output operation of the second initiator; and
unlocking the requested storage region after the input/output operation of the second initiator is complete.

12. The method of claim 8, further comprising:
invalidating an input/output cache in a second of the initiators upon when locking the requested storage region to maintain input/output data coherency,
wherein the input/output cache of the second initiator is associated with the requested storage region.

13. The method of claim 8, further comprising:
coordinating region lock management with an initiator performing region lock management on another plurality of Redundant Array of Independent Disks logical volumes.

14. The method of claim 8, wherein:
the request is a Serial Management Protocol request,
the message initiator of the expander comprises a Serial Management Protocol initiator, and
the message target of the expander comprises a Serial Management Protocol target.

15. The method of claim 8, further comprising:
unlocking the requested storage region in response to a Serial Management Protocol request from the initiator to unlock the requested storage region.

16. A non-transitory computer readable medium comprising instructions that, when executed by a processor of an expander, direct the processor to:
link a plurality of initiators to logical volumes through a plurality of physical transceivers of the expander, wherein each of the logical volumes comprises a plurality of storage regions;
couple the expander to the plurality of initiators with both a message target of the expander and a message initiator of the expander, the message target of the expander being responsible for receiving requests from the plurality of initiators, the message initiator of the expander being responsible for transmitting requests to the plurality of initiators;
receive a request from a first of the initiators to lock a storage region of the logical volumes for an input/output operation by the first initiator, the request being received at the message target of the expander;
forward the received request from the message target of the expander to a region lock manager;
process, with the region lock manager, the received request;
determine if the requested storage region of the logical volumes is unlocked;
lock the requested storage region from the remaining initiators to allow the input/output operation of the first initiator responsive to determining the requested storage region is unlocked; and
unlock the requested storage region after the input/output operation of the first initiator is complete.

17. The computer readable medium of claim 16, further comprising instructions that direct the processor to:
queue requests from the remaining initiators for the requested storage region until the requested storage region is unlocked.

18. The computer readable medium of claim 16, further comprising instructions that direct the processor to:
link to another expander to provide region lock management for at least one of the plurality of logical volumes coupled to the other expander.

19. The computer readable medium of claim 16, further comprising instructions that direct the processor to:
access a queue to retrieve a request from a second initiator in response to unlocking the requested storage region after the input/output operation of the first initiator is complete; and
lock the requested storage region from the remaining initiators to allow the input/output operation of the second initiator; and
unlock the requested storage region after the input/output operation of the second initiator is complete.

20. The computer readable medium of claim 16, further comprising instructions that direct the processor to:
invalidate an input/output cache in a second of the initiators upon when locking the requested storage region to maintain input/output data coherency,
wherein the input/output cache of the second initiator is associated with the requested storage region.

* * * * *